United States Patent [19]
Karnik et al.

[11] Patent Number: 5,619,705
[45] Date of Patent: Apr. 8, 1997

[54] SYSTEM AND METHOD FOR CASCADING MULTIPLE PROGRAMMABLE INTERRUPT CONTROLLERS UTILIZING SEPARATE BUS FOR BROADCASTING INTERRUPT REQUEST DATA PACKET IN A MULTI-PROCESSOR SYSTEM

[75] Inventors: Milind Karnik, Aloha; Joseph Batz, Beaverton, both of Oreg.

[73] Assignee: Intel Corporation, Santa Clara, Calif.

[21] Appl. No.: 661,341

[22] Filed: Jun. 12, 1996

Related U.S. Application Data

[63] Continuation of Ser. No. 168,463, Dec. 16, 1993, abandoned.

[51] Int. Cl.$^6$ .............................. G06F 13/24; G06F 13/26
[52] U.S. Cl. .................. 395/739; 395/742; 364/DIG. 1; 364/241.5; 364/241.6; 364/DIG. 2; 364/931.4; 364/941; 364/941.3; 364/941.91; 364/941.7
[58] Field of Search ..................................... 395/733, 739, 395/741, 742, 868, 870

[56] References Cited

U.S. PATENT DOCUMENTS

| | | | |
|---|---|---|---|
| 3,812,463 | 5/1974 | Lahti et al. | 340/172.5 |
| 3,895,353 | 7/1975 | Dalton | 340/172.5 |
| 3,905,025 | 9/1975 | Davis et al. | 395/725 |
| 4,250,546 | 2/1981 | Boney et al. | 395/725 |
| 4,268,904 | 5/1981 | Suzuki et al. | 364/200 |
| 4,271,468 | 6/1981 | Christensen et al. | 395/859 |
| 4,394,730 | 7/1983 | Suzuki et al. | 364/200 |
| 4,420,806 | 12/1983 | Johnson, Jr. et al. | 364/200 |
| 4,435,780 | 3/1984 | Herrington et al. | 364/900 |
| 4,482,954 | 11/1984 | Vrielink et al. | 364/200 |
| 4,484,264 | 11/1984 | Friedli et al. | 395/200.2 |
| 4,621,342 | 11/1986 | Capizzi et al. | 364/900 |
| 4,648,029 | 3/1987 | Cooper et al. | 364/200 |
| 4,654,820 | 3/1987 | Brahm et al. | 364/900 |
| 4,788,639 | 11/1988 | Tamarau | 364/200 |

(List continued on next page.)

FOREIGN PATENT DOCUMENTS

| | | |
|---|---|---|
| 241552 | 2/1990 | Japan . |
| 2165367 | 6/1990 | Japan . |
| 1357576 | 6/1974 | United Kingdom . |

OTHER PUBLICATIONS

L.C. Eggebrecht, "Interfacing to the IBM Personal Computer", pp. 150–153 (1990).

Thorne, M. "Computer Organization and Assembly Language Programming For IBM PC's and Compatibles", 2nd Ed., pp. 537–561.

PCT – International Search Report regarding International Patent application No. PCT/U094/13702, mailed May 9, 1995.

Translation of the Decision of the National Bureau of Standards (Taiwan) Apr. 23, 1996.

(List continued on next page.)

Primary Examiner—Thomas C. Lee
Assistant Examiner—D. Dinh
Attorney, Agent, or Firm—Blakely, Sokoloff, Taylor & Zafman

[57] ABSTRACT

A multi-processor system that supports multiple programmable interrupt controllers (PIC). An advanced programmable interrupt controller (APIC) provides interface between the processors and the PICs. The APIC provides interface between processors and other I/O devices also. The APIC sends an interrupt request data packet with a first field set to a processor identification number, a second field set to a type of the device that sent interrupt request and a third field. The third field is set to an interrupt vector if the device sending the interrupt request to the APIC is a device other than PIC. The third field is set to a predetermined identification number of the PIC if the interrupt request is from the PIC. A processor, to which the interrupt is directed to, receives the packet. If the interrupt request is from a PIC, the processor uses the third field to identify which of the multiple PICs caused the interrupt. If the interrupt is from a device, other than a PIC, the processor uses the third field to determine an interrupt vector corresponding to the device.

7 Claims, 3 Drawing Sheets

U.S. PATENT DOCUMENTS

| | | | |
|---|---|---|---|
| 4,796,176 | 1/1989 | D'Amico et al. | 364/200 |
| 4,805,096 | 2/1989 | Crohn | 364/200 |
| 4,833,598 | 5/1989 | Imamura et al. | 364/200 |
| 4,839,800 | 6/1989 | Barlow et al. | 364/200 |
| 4,860,196 | 8/1989 | Wengert | 364/200 |
| 4,866,664 | 9/1989 | Burkhardt, Jr. et al. | 395/200 |
| 4,868,742 | 9/1989 | Gant et al. | 364/200 |
| 4,903,270 | 2/1990 | Johnson et al. | 371/68.1 |
| 4,914,580 | 4/1990 | Jensen et al. | 364/200 |
| 4,920,486 | 4/1990 | Nielsen | 364/200 |
| 4,930,070 | 5/1990 | Yonekura et al. | 364/200 |
| 4,953,072 | 8/1990 | Williams | 364/200 |
| 4,980,854 | 12/1990 | Donaldson et al. | 364/900 |
| 5,060,139 | 10/1991 | Theus | 364/200 |
| 5,067,071 | 11/1991 | Schanin et al. | 395/275 |
| 5,083,261 | 1/1992 | Wilkie | 395/725 |
| 5,099,414 | 3/1992 | Cole et al. | 395/200 |
| 5,101,497 | 3/1992 | Culley et al. | 395/725 |
| 5,123,094 | 6/1992 | MacDougall | 395/375 |
| 5,125,093 | 6/1992 | McFarland | 395/739 |
| 5,146,597 | 9/1992 | Williams | 395/741 |
| 5,179,707 | 1/1993 | Piepho | 395/725 |
| 5,193,187 | 3/1993 | Strout, II et al. | 395/650 |
| 5,201,051 | 4/1993 | Koide | 395/741 |
| 5,210,828 | 5/1993 | Bolan et al. | 395/200 |
| 5,218,703 | 6/1993 | Fleck et al. | 395/725 |
| 5,261,107 | 11/1993 | Klim et al. | 395/725 |
| 5,265,215 | 11/1993 | Fukuda et al. | 395/325 |
| 5,274,767 | 12/1993 | Maskovyaka | 395/275 |
| 5,276,690 | 1/1994 | Lee et al. | 371/3 |
| 5,282,272 | 1/1994 | Guy et al. | 395/275 |
| 5,283,869 | 2/1994 | Adams et al. | 395/200 |
| 5,283,904 | 2/1994 | Carson et al. | 395/739 |
| 5,325,536 | 6/1994 | Chang et al. | 395/725 |
| 5,410,710 | 4/1995 | Sarangdhar et al. | 395/725 |
| 5,428,794 | 6/1995 | Williams | 395/741 |

OTHER PUBLICATIONS

Decision of the National Bureau of Standards (Taiwan) Apr. 23, 1996.

Notice for the Reason of Refusal (Japan) Apr. 16, 1996.

Translation of the Notice for the Reason of Refusal (Japan) Apr. 16, 1996.

Popescu, Val et al., "The Metaflow Architecture," IEEE Micro, pp. 10–13 and 63–73 (Jun., 1991).

SYSTEM AND METHOD FOR CASCADING MULTIPLE PROGRAMMABLE INTERRUPT CONTROLLERS UTILIZING SEPARATE BUS FOR BROADCASTING INTERRUPT REQUEST DATA PACKET IN A MULTI-PROCESSOR SYSTEM

This is a continuation of application No. 08/168,463, filed Dec. 16, 1993, now abandoned.

FIELD OF THE INVENTION

The present invention pertains to the field of multi-processor computer systems and more specifically to input/output devices for use in such systems.

BACKGROUND OF THE INVENTION

Computer systems which utilize programmable interrupt controllers (PICs) in a single processor environment are well known in the prior art. Intel Corporations part number 8259A is an example of a PIC used in such single processor systems. The PICs serve as interface units between the input/output (I/O) devices and the processor in handling interrupt requests. The PIC accepts an interrupt request from the I/O devices and issues an interrupt request to the processor on an interrupt line. On receiving the interrupt request from the PIC, the processor generally initiates an interrupt acknowledge cycle. In the interrupt acknowledge cycle, the PIC sends an interrupt vector to the processor, which identifies an interrupt handler routine in the processor. The processor executes the interrupt handler routine to handle the interrupt pending on the I/O device.

With the advent of multi-processor computer systems, interrupt management systems that dynamically distribute the interrupt among the processors have been implemented. Intel's Advanced Programmable Interrupt Controller Architecture is an example of such a system. Typically, such an interrupt management system includes at least three functional components: 1. Advanced Programmable Interrupt Controllers (APIC) that provide interface lines on which I/O devices or PICs send interrupts into the system 2. Processors with modules to receive and service the interrupt requests from the I/O devices and 3, a bus that connects the processors and the APICs.

When an interrupt is pending, the I/O device or the PIC that is connected directly to the APIC sends an interrupt signal to the APIC. In response, the APIC broadcasts an interrupt request data packet on the bus. The interrupt request data packet contains a first field set to the identification number of the destination processor, a second field set to identify the type of device causing the interrupt and a third field set to the interrupt vector.

On receiving the interrupt request data packet, each of the processors examines the first field to determine if the interrupt request is directed to it. The processor then uses the interrupt vector in the third field to determine the address of the interrupt service routine. The processor executes the interrupt service routine to process the interrupt.

One of the basic requirements of a multi-processor system is to support PICs so as to be backward compatible with the prior application base. In this case, the PICs generally interlace with the APICs using the interface lines of the APIC. The PIC is connected to the I/O devices and provides the interface between the APIC and these I/O devices. The APIC may have other I/O devices connected directly on the other interface lines.

When an I/O device connected to a PIC has an interrupt pending to be processed, it sends an interrupt request signal to the PIC. In response, the PIC sends another signal to the APIC on the interface lines. The APIC broadcasts an interrupt request data packet on the bus to which all the processors couple. In the interrupt request data packet, the first field is set to the identification number of processor to which the interrupt is to be directed to; and the second field is set to identify the type of device causing the interrupt. The APIC does not use the third field that is used to specify an interrupt vector. The processor, which processes the interrupt, gets the interrupt vector from the PIC in a subsequent interrupt acknowledge cycle. The processor determines an interrupt service routine based on the interrupt vector and processes the interrupt pending on the I/O device by executing the service routine.

However, these multi-processor based systems suffer from the drawback that only one PIC can be supported in a given multi-processor system. This is because there is no field in the interrupt request data packet to identify the PIC that initially caused the APIC to send the interrupt request data packet. What is needed is a mechanism to identify the PIC that has sent the interrupt request when multiple PICs are present in the multi-processor system so that the resulting interrupt acknowledge cycle can be directed to the identified PIC. This will enable the multi-processor system to support multiple PICs.

SUMMARY OF THE INVENTION

The present invention allows the operation of multiple programmable interrupt controllers (PIC)in a multi-processor system environment. The advanced programmable interrupt controllers (APIC) provide interface between the processors and the peripheral devices. The peripheral devices include a second I/O device and a PIC. The PIC further provides interface between a first I/O device and the APIC. The processors are connected to the APICs by means of a first bus.

The first I/O device sends an interrupt request signal to the PIC when the first I/O device has an interrupt pending to be processed. The PIC in response sends another interrupt request signal to the APIC. The APIC assembles an interrupt request data packet in response to the interrupt request signal from the PIC. The interrupt request data packet contains a third field set to an unique identification number of the PIC which had sent the interrupt request. The APIC sets the same third field to an interrupt vector corresponding to the second I/O device in response to an interrupt request from the second I/O device that directly interfaces with the APIC. The APIC sets a first field in the interrupt request data packet to an unique identification number of the destination processor. The APIC further sets a second field in the interrupt request data packet to a value corresponding to the type of the device that is sending the interrupt request signal.

The APIC broadcasts the interrupt request data packet on the first bus. The processor, to which the interrupt is directed to, receives the interrupt request data packet on the first bus. The processor examines the fields in the packet received to determine the type of device causing the interrupt.

If the type of device causing the interrupt is a PIC, the processor uses the PIC identification number in the third field to identify the specific PIC causing the interrupt. The processor initiates communication with the PIC to get an interrupt vector corresponding to the first I/O device that originated the interrupt request. If the type of device indicated is an I/O device, the processor gets the interrupt vector corresponding to the second I/O device from the third field in the interrupt request data packet. The processor identifies an interrupt processing routine based on the interrupt vector and processes the interrupt pending on the I/O device.

Thus, a multi-processor system that supports multiple PICs, as well as other I/O devices, is described.

BRIEF DESCRIPTION OF THE DRAWINGS

In the foregoing specification, the invention has been described with reference to specific exemplary embodiments thereof, it will, however, be evident that various modification and changes may be made thereto without departing from the broader spirit and scope of the invention as set forth in the appended claims. The specifications and drawings are, accordingly, to be regarded illustrative rather than restrictive.

DETAILED DESCRIPTION

A multi-processor computer system that supports multiple programmable interrupt controllers (PIC) is described. Numerous specific details are set forth in this description in order to provide a thorough understanding of the invention. It will be obvious, however to one skilled in the art that these specific details need not be used to practice the present invention. In other instances, well-known system components and circuits have not been described in detail in order to avoid obscuring the present invention.

Figure 1:
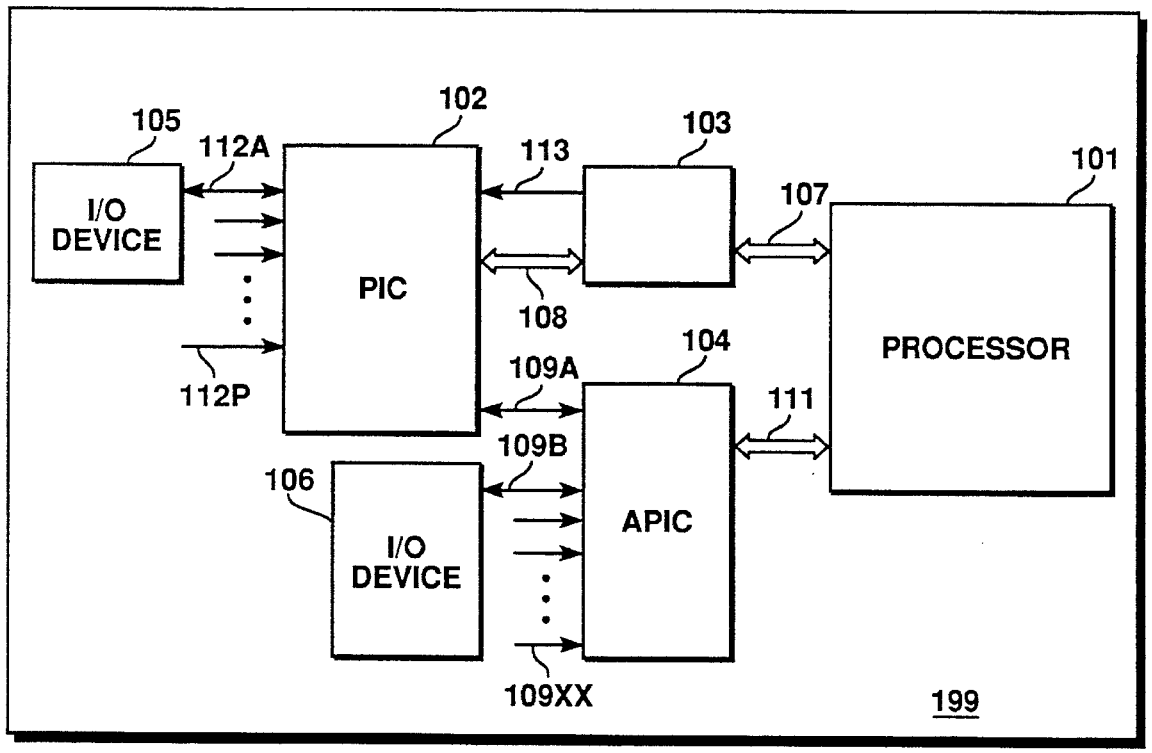
FIG. 1 is a block diagram of a computer system in accordance with the present invention.

FIG. 1 shows a multi-processor computer system 199 comprising a processor 101 coupled to an APIC 104 via a bus 111. Each of the processors has an unique processor identification number associated with it. A programmable interrupt controller PIC 102 and an I/O device 106 such as a disk drive use the interface lines 109-A and 109-B respectively to send an interrupt request to APIC 104. In one embodiment, APIC 104 supports 240 such interface lines. In a preferred embodiment, there can be more than one PIC interfacing with APIC 104. Similarly, there can be more than one APIC in a multi-processor computer system 199 in accordance with the present invention. Each of PICs in the multi-processor system has a unique PIC identification number associated with it.

The PIC 102 provides input lines 112-A to 112-P for receiving interrupt request signals from various I/O devices. For example, an I/O device 105 uses line 112-A to send an interrupt request to PIC 102. In response, PIC 102 sends an interrupt request signal to APIC 104 on interface line 109-A. On the other hand, I/O device 106 sends an interrupt request signal directly to APIC 104 when an interrupt is pending on I/O device 106. In response to an interrupt request from PIC 102 or I/O device 106, APIC 104 broadcasts an interrupt request data packet on bus 111. The processor 101 receives the interrupt request data packet on bus 111 and processes the interrupt if it is directed to it.

The multi-processor computer system further comprises a communication device 103 for providing interface between processor 101 and a PIC 102. The communication device 103 uses a bus 107 to communicate with processor 101. The communication device 103 uses an interrupt acknowledge line 113 to signal an interrupt acknowledge cycle to PIC 102. The PIC 102 uses bus 108 to send an interrupt vector, corresponding to the I/O device that initiated the interrupt process request to the communication device 103.

Figure 2A:
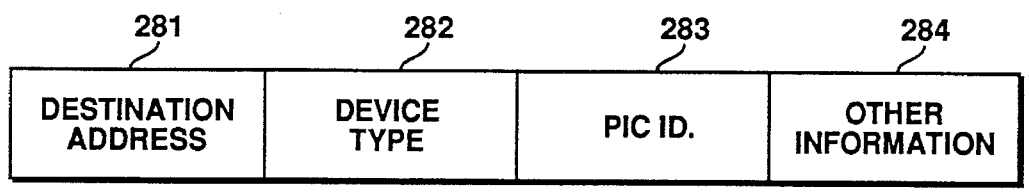
FIG. 2A is the packet format used by the APIC to communicate with the processor when an interrupt request is received from a PIC.

FIG. 2a shows the format of the interrupt request data packet, the APIC 104 broadcasts on bus 111 in response to an interrupt request from PIC 102 on interface line 109-A. The packet comprises three fields. The first field specifies the destination processor to which the interrupt request is directed to. In a preferred embodiment, specific values are defined to specify a group of processors. In the case of a single processor being specified, the unique processor identification of the intended processor is used. The second field specifies the type of device that sent the interrupt request to the APIC 104. In a preferred embodiment a value of 7 specifies that a device of type PIC has sent the interrupt request to the APIC. However, it will be obvious to one skilled in the art the present invention can be practiced with a different set of values without departing from the spirit of the present invention. When the second field indicates that a device of type PIC sent the interrupt request, the third field specifies the PIC identification of the PIC 102 in the field. This field is subsequently used by communication device 103 to identify which of the multiple PICs actually sent the interrupt request to the APIC.

Figure 2B:
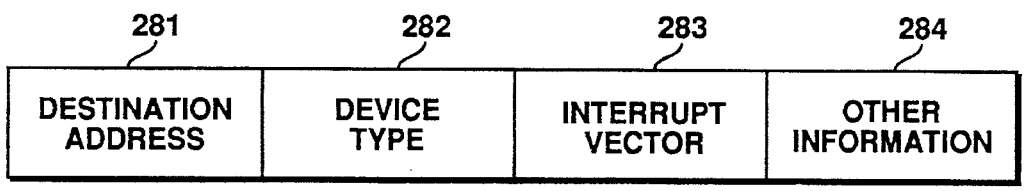
FIG. 2B is the packet format used by the APIC to communicate with the processor when an interrupt request is received from an I/O device other than a PIC.

Similarly FIG. 2b shows the format of the interrupt request data packet the APIC 104 broadcasts in response to a interrupt request from I/O device 106 which interfaces directly to APIC 104. The first and second fields are used similar to in FIG. 2a. The first field specifies the destination processor. The second field specifies the type of the device that sent the interrupt request on the interface lines of APIC 104. In the case when the type of device is not a PIC, the third field is set to an interrupt vector corresponding to I/O device 106. The interrupt vector identifies a interrupt service routine in processor 101. In a preferred embodiment, the interrupt vector table is stored in APIC 104 and can be set by the user.

Figure 3A:
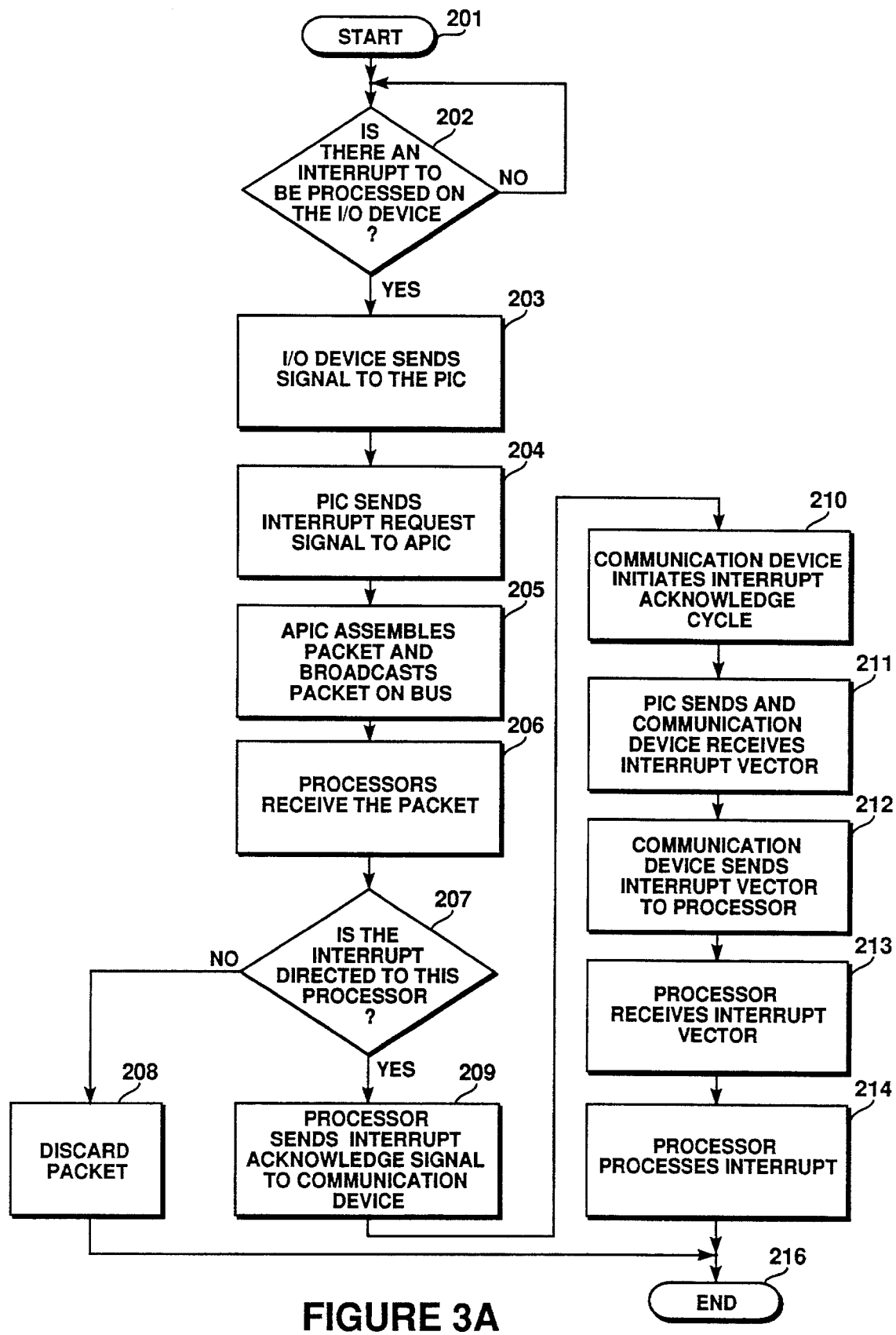
FIG. 3A is a flow chart depicting the steps for processing an interrupt from a device coupled to a programmable interrupt controller(PIC) in accordance with the present invention.

FIG. 3A shows a flow-chart illustrating the processing of an interrupt on the I/O device 105 coupled to PIC 102 in accordance with the present invention. In step 202, I/O device 105 determines if there is a interrupt pending that needs to be processed. When an interrupt is pending, I/O device 105 sends an interrupt request signal to PIC 102 using line 112-A in step 203. In response, PIC 102 receives the interrupt request and sends an interrupt request signal to APIC 104 on line 109-A in step 204.

APIC 104 receives the interrupt request signal and assembles a interrupt request data packet in step 205 in accordance with format in FIG. 3A. The first field is set to the unique identification number of the processor, if the interrupt is to be directed to a single processor. On the other hand, a group identification number may also be specified to specify a group. The second field is set to a value 07 to indicate that a device of type PIC has sent the interrupt request to APIC 104. The third field is set to the PIC identification number of PIC 102.

APIC 104 broadcasts the packet thus assembled on bus 111 in step 205. All the processors in the multi-processor system, including the processor 101, receive the packet n step 206. Each of the processors examines the first field to see if the value in the first field matches the processor's own unique processor identification number in step 207. If there is a match, processor 101 determines that the interrupt is directed to it. If the destination address specifies a group of processors, the processors in the group may engage in an arbitration process to determine which processor should handle the interrupt. If processor 101 is determined not to be the one to handle the interrupt request, processor 101 discards the packets in step 208.

If processor 101 is determined to be the one to process the interrupt request, processor 101 forwards the third field in the interrupt request data packet to communication device 103 requesting to initiate an interrupt acknowledge cycle in step 209. This third field contains the PIC identification number of PIC 102 that sent the interrupt request signal to APIC 104. The communication device 103 uses the PIC identification number to identify PIC 102 among the multiple PICs present in the multiprocessor system. The communication device 102 initiates an interrupt acknowledge cycle with the PIC thus determined in step 210. In step 211, the PIC sends and communication device 103 receives an interrupt vector corresponding to the interrupt pending on I/O device 105 coupled to PIC 102 that initiated the interrupt processing. The communication device 102 passes the interrupt vector to processor 101 in step 212. Processor 101 receives the interrupt vector and identifies the corresponding interrupt service routine in step 213. In a preferred embodiment, the interrupt vector is a pointer to the address of an interrupt service routine in the processor. Processor 101 then executes the interrupt service routine to process the interrupt pending on I/O device 105 that initiated the interrupt request.

Figure 3B:
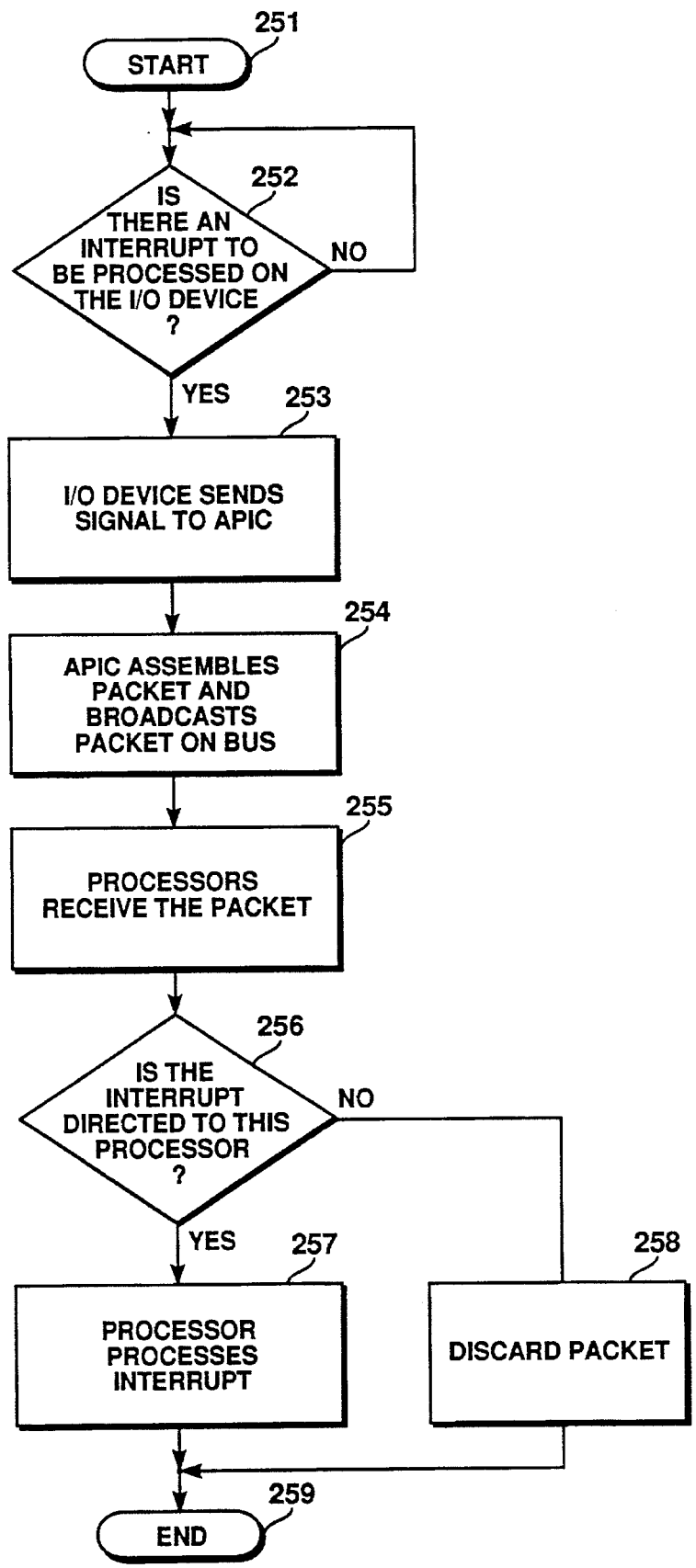
FIG. 3B is a flow chart depicting the steps for processing an interrupt from a device coupled to the APIC in accordance with the present invention.

Similarly FIG. 3B shows a flow chart describing the processing of an interrupt from I/O device 106 that interfaces directly to APIC 104. In step 252, I/O device 106 determines if there is interrupt pending that needs to be serviced by a processor in the multi-processor system. When it determines so, I/O device 106 sends a signal to APIC 104 in step 253.

On receiving the signal, APIC 104 assembles an interrupt request data packet in accordance with the format in FIG. 2b. The first field is set to the processor identification number of the processor to which the interrupt is to be directed to. The field may also specify a value to specify a group of processors. The second field is set to a value to indicate the type of I/O device 106. The third field is set to an interrupt vector value corresponding to I/O device 106. As explained, the interrupt vector table is stored in APIC 104 in a preferred embodiment.

In step 254, APIC 104 broadcasts the interrupt request data packet assembled on bus 111. All the processors coupled to bus 111 receive the interrupt request data packet in step 255. Processor 101 then determines if the interrupt request is directed to it based on the value in first field of the packet in step 256. If the value corresponds to multiple processors, the processors engage in an arbitration scheme to determine which processor is to process the interrupt. If the processor determines that the interrupt request is not directed to it, it discards the interrupt request data packet.

The processor 101 determines that the type of I/O device 106 sending the interrupt request to the APIC is not a PIC based on the value in the second field in the interrupt request data packet. The processor gets the interrupt vector from the third field in the interrupt request data packet. The processor then uses the interrupt vector to determine the interrupt service routine. In the present embodiment, the interrupt vector field is a pointer to the memory address of interrupt service routine. In step 256, the processor processes the pending interrupt using the interrupt service routine thus determined.

Thus the present invention describes a multi-processor system in which multiple PICs are supported.

What is claimed is:

1. A multi-processor system comprising:

a first bus coupled to said at least one processor;

a first I/O device operable to generate a first interrupt request signal when an interrupt is pending thereon;

a first interrupt controller, coupled to said first I/O device and having a first device type value and a predetermined identification number, operable to generate a second interrupt request signal in response to said first interrupt request signal:

a second interrupt controller, coupled to said first bus and to said first interrupt controller, operable to broadcast an interrupt request data packet on said first bus in response to said second interrupt request signal, said interrupt request data packet comprising a second field set to said first device type value and a third field set to said predetermined identification number;

a second I/O device, having a second device type value and coupled to said second interrupt controller, operable to send a third interrupt request signal to said second interrupt controller when an interrupt request is pending on said second I/O device, said second interrupt controller being further overable to broadcast said interrupt request data packet in response to said third interrupt request signal, said second field in said interrupt request data packet being set to said second device type value and said third field therein being set to a second interrupt vector corresponding to said second I/O device and identifying an interrupt service routine to process said interrupt pending on said second I/O device;

a processor operable to identify said first interrupt controller based on said second field and said third field;

a communication device coupled to said first interrupt controller; and a second bus coupled to said processor and said communication device.

2. The multi-processor system of claim 1 wherein said processor processes said interrupt pending on said first I/O device based on a first interrupt service vector received from said first interrupt controller via said communication device and said second bus.

3. The multi-processor system of claim 1 wherein said interrupt request data packet is received by all processors coupled to said bus.

4. The multi-processor system of claim 1 wherein said third field can specify more than one first interrupt controller.

5. The multi-processor system of claim 1 wherein said processor determines said second interrupt vector based on said third field if said second field is not set to said first device type value, said processor using said second interrupt service routine based on said second interrupt vector to process said interrupt pending on said second I/O device.

6. The multi-processor system of claim 1 wherein said processor processes said interrupt pending on said first I/O device by executing a first interrupt service routine corresponding to a first interrupt service vector received from said first interrupt controller via said communication device and said second bus.

7. A method of processing interrupts in a multi-processor system comprising:

- a first I/O device generating a first interrupt request signal when an interrupt is pending therefrom;
- a first interrupt controller generating a second interrupt request signal in response to said first interrupt request signal;
- a second interrupt controller broadcasting an interrupt request data packet on a first bus in response to said second interrupt request signal, said interrupt request data packet comprising a second field set to a value indicating the device type of said first interrupt controller and a third field set to a value identifying said first interrupt controller;
- a processor receiving said interrupt request data packet from said bus, identifying said first interrupt controller based on said second field and said third field, requesting and receiving a first interrupt service vector from said first interrupt controller on a second bus, and using a first interrupt service routine corresponding to said first interrupt service vector to process said interrupt pending on said first I/O device;
- a second I/O device sending a third interrupt request signal to said second interrupt controller when an interrupt request is pending on said second I/O device;
- said second interrupt controller broadcasting on said bus said interrupt request data packet in response to said third interrupt request signal, said second field within said interrupt request data packet being set to a value indicating the device type of said second I/O device and said third field therein being set to a second interrupt vector corresponding to said second I/O device; and
- said processor receiving said interrupt request data packet from said first bus, identifying said second I/O device based on said second field, and using a second interrupt service routine corresponding to said second interrupt service vector extracted from said third field to process said interrupt pending on said second I/O device.

* * * * *

UNITED STATES PATENT AND TRADEMARK OFFICE
CERTIFICATE OF CORRECTION

PATENT NO. : 5,619,705
DATED : April 8, 1997
INVENTOR(S) : Karnik et al.

It is certified that error appears in the above-identified patent and that said Letters Patent is hereby corrected as shown below:

In column 1 at line 20 delete "Intel Corporations" and insert --Intel Corporation's--

In column 1 at line 63 delete "interlace" and insert --interface--

In column 3 at line 13 delete "thereof, it" and insert --thereof. It--

In column 6 at line 33 delete "overable" and insert --operable--

In column 8 at line 8 delete "said bus" and insert --said first bus--

Signed and Sealed this

Second Day of December,1997

Attest:

BRUCE LEHMAN

*Attesting Officer*  *Commissioner of Patents and Trademarks*